US008565058B2

(12) United States Patent
Shiono et al.

(10) Patent No.: US 8,565,058 B2
(45) Date of Patent: Oct. 22, 2013

(54) LIQUID CRYSTAL ALIGNMENT FILM, PROCESS FOR ITS PRODUCTION, OPTICAL ELEMENT USING THE LIQUID CRYSTAL ALIGNMENT FILM, AND OPTICAL INFORMATION WRITING/READING DEVICE

(71) Applicant: Asahi Glass Company, Limited, Chiyoda-ku (JP)

(72) Inventors: Kazuhiko Shiono, Tokyo (JP); Hiroshi Kumai, Tokyo (JP); Yoshiharu Ooi, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/708,120

(22) Filed: Dec. 7, 2012

(65) Prior Publication Data
US 2013/0163399 A1    Jun. 27, 2013

(30) Foreign Application Priority Data

Dec. 26, 2011    (JP) .................................. 2011-284111

(51) Int. Cl.
*G11B 7/00*    (2006.01)
*C08G 73/10*    (2006.01)
*C09K 19/02*    (2006.01)

(52) U.S. Cl.
USPC ........................ 369/112.03; 428/1.2; 349/127

(58) Field of Classification Search
USPC ........... 369/112.01, 112.02, 112.03; 349/123, 349/132, 130, 127, 158; 445/24; 428/1.1, 428/1.2, 1.25; 528/337, 340, 342
See application file for complete search history.

(56) References Cited

U.S. PATENT DOCUMENTS

| 7,935,396 B2 * | 5/2011 | Matsumori et al. ............ 428/1.2 |
| 2012/0135661 A1 * | 5/2012 | Imanishi et al. ................ 445/24 |
| 2012/0269050 A1 | 10/2012 | Okada et al. |

FOREIGN PATENT DOCUMENTS

| JP | 5-232473 | 9/1993 |
| JP | 6-289374 | 10/1994 |
| JP | 8-15681 | 1/1996 |
| JP | 9-5747 | 1/1997 |
| JP | 10-251646 | 9/1998 |
| JP | 11-125821 | 5/1999 |
| JP | 11-152475 | 6/1999 |
| JP | 11-189665 | 7/1999 |
| JP | 11-258611 | 9/1999 |
| JP | 2001-100214 | 4/2001 |
| JP | 2002-250924 | 9/2002 |
| JP | 2002-258303 | 9/2002 |
| JP | 2006-285197 | 10/2006 |

* cited by examiner

*Primary Examiner* — Nabil Hindi
(74) *Attorney, Agent, or Firm* — Oblon, Spivak, McClelland, Maier & Neustadt, L.L.P.

(57) ABSTRACT

To provide a liquid crystal alignment film having a sufficient alignment-regulating power and high resistance against blue laser beam and having, at the same time, excellent adhesion, and an optical element using it. A liquid crystal alignment film obtainable by bonding, by chemisorption to a substrate, an alignment-regulating precursor which undergoes anisotropic decomposition by irradiation with polarized ultraviolet light, and irradiating the alignment-regulating precursor bonded to the substrate, with polarized ultraviolet light, to let it undergo anisotropic decomposition and exhibit an alignment-regulating power.

13 Claims, 1 Drawing Sheet

LIQUID CRYSTAL ALIGNMENT FILM, PROCESS FOR ITS PRODUCTION, OPTICAL ELEMENT USING THE LIQUID CRYSTAL ALIGNMENT FILM, AND OPTICAL INFORMATION WRITING/READING DEVICE

BACKGROUND OF INVENTION

1. Field of Invention

The present invention relates to a liquid crystal alignment film and a process for its production, as well as an optical element using the liquid crystal alignment film and an optical information writing/reading device using the optical element. More particularly, it relates to a liquid crystal alignment film useful for preparing, by means of optical anisotropy of liquid crystal, an optical element to be used for optical pickup, imaging or communication, and a process for its production, as well as an optical element and an optical information writing/reading device using the optical element.

2. Discussion of Background

At the time of reading out information recorded on an optical disk or writing information on an optical disk, an optical element for shifting (polarizing, diffracting, phase-adjusting, etc.) laser beam is required. For example, at the time of reading out information, linearly polarized light emitted from a laser light source reaches an optical disk surface via a polarizing element and then via a retardation plate. The outgoing linearly polarized light will pass linearly through the polarizing plate since it is aligned in a direction not to be changed by the polarizing plate and will then be shifted to circularly polarized light by the retardation plate. This circularly polarized light will be reflected by the information-recording surface of the optical disk to form a reversely rotated circularly polarized light, and will then be converted again by the retardation plate to linearly polarized light, of which the polarization direction is perpendicular to one prior to incidence. This returning light flux will have its travelling direction bent at the time of passing again through the polarizing element and will then reach a light receiving element.

Further, at the time of reading out or writing information, if face deflection of an optical disk or the like occurs, the focus position of the beam spot is displaced from the information-recording surface, and therefore, a servo mechanism is required to detect and correct the focus position to let the beam spot follow the concavoconvex pits on the information-recording surface. Such a servo system for an optical disk is constructed to detect the position of the truck after adjusting the focus of the beam spot radiated from a laser light source on the information-recording surface and to let the focus position follow the desired truck. Further, it is also required to make sure that laser beam reflected without hitting pits on the information-recording surface will not be returned, as it is, to the light source.

For this purpose, an optical element to shift the laser beam is required for an optical information writing/reading device. For example, a retardation plate (a wavelength plate) has an effect to give a different refractive index to incident light, by an angle between the optical axis of the retardation plate and the phase plane of incident light and further to displace the phases of two component lights formed by birefringence. The two lights having the phases displaced, will be combined when emitted from the retardation plate. The displacement of the phases is determined by the thickness of the retardation plate, and therefore, by adjusting the thickness, it is possible to prepare a quarter wavelength plate to displace the phases by $\pi/2$, a half wavelength plate to displace the phases by $\pi$, etc. For example, linearly polarized light passed through a quarter wavelength plate becomes circularly polarized light, and linearly polarized light passed through a half wavelength plate becomes linearly polarized light having its polarization plane tilted by 90°. By utilizing such natures, a combination of elements is applied to e.g. a servo mechanism. Such an optical element is useful for not only an optical pickup element utilized to read out information from an optical disk, but also an imaging element for projectors, etc., a communication device for tunable filters, etc.

Further, such an optical element may be prepared from a liquid crystal material. Liquid crystal molecules having polymerizable functional groups have both a nature as a polymerizable monomer and a nature as liquid crystal. Therefore, when liquid crystal molecules having polymerizable functional groups are aligned and then polymerized, it is possible to obtain an optical anisotropic material having alignment of liquid crystal molecules fixed. The optical anisotropic material has an optical anisotropy such as a refractive index anisotropy derived from a mesogenic structure, and is used for a diffraction element, a retardation plate, etc. by utilizing such a nature.

Further, for multifunctionality of an optical element, multidomain alignment is desired. Once a multidomain alignment pattern can be formed, it is possible to change the outgoing polarized light pattern for every domain. For example, by controlling the outgoing polarized light pattern, it is possible to prepare a depolarization element, a polarized light transmittance-controlling element or a diffraction element. The multidomain alignment is meant for an alignment pattern having differently-aligned domains in one substrate. The multidomain alignment may be formed by a process such as a photo-alignment method, a mask rubbing method or a groove alignment method. However, in consideration of the productivity, costs, alignment to liquid crystal or refinement of patterns, photo-alignment is preferred. In the marketplace, the multidomain alignment pattern is used as a new technique for a 3D retardation film or a liquid crystal panel.

In a photo-alignment process, a photo-alignment film formed on a substrate is irradiated with polarized ultraviolet light, whereby the alignment direction of liquid crystals is controlled by the light. In such a photo-alignment process, the alignment-regulating power may be provided only at a domain irradiated by the light, and by using a mask to partially shield the light, such as a Cr mask, it is possible to easily form domains having different alignment directions in the same substrate plane.

In the alignment technique using the photo-alignment, it is possible to align liquid crystals by irradiation with polarized ultraviolet light without requiring conventional rubbing treatment, and by this method, there will be no formation of static electricity or scratches on the film surface. As a photo-alignment material which has been reported, one using a dichromatic azo dye may be mentioned (Patent Documents 1 to 3). According to this method, a film surface is irradiated with polarized ultraviolet light, and by utilizing photo-isomerization of the azo dye, liquid crystal molecules are aligned in a certain direction.

As another system, a system has been studied wherein an organic film containing a cinnamate structure (Patent Documents 4 to 6) or a chalcone structure (Patent Documents 7 to 10) is irradiated with polarized ultraviolet light to form a cross-linked structure thereby to provide an alignment-regulating power.

Further, a system has also been reported wherein a polyimide film is irradiated with polarized ultraviolet light to cause an anisotropic photodecomposition thereby to impart anisotropy to the polyimide film and thus provide an alignment-regulating power (Patent Document 11).

A problem common to the above-mentioned conventional photo-alignment films is such that the light resistance against blue laser is inadequate. This is attributable to conventional photo-alignment materials having such a structure that in order to increase the sensitivity to polarized ultraviolet light, their absorption of ultraviolet light is made high. If the conventional photo-alignment films are exposed to blue laser beam (405 nm) for Blu-ray applications, the alignment films themselves undergo deterioration caused by absorption, and such conventional materials are not able to satisfy the level of light resistance in Blu-ray applications which increases year after year. Not only in Blu-ray applications, but also with respect to optical elements in imaging applications, severe light resistance is required against green laser of 532 nm, and the light resistance of the alignment films themselves becomes very important, since it is directly influential over the light resistance of the entire optical elements.

The light resistance of a film usually tends to be improved as the film becomes thin. A method has been proposed wherein a single layer of a silane coupling agent is used to have temporary alignment formed in a drain liquid off direction by an organic solvent, thereby to increase the sensitivity for photocrosslinking during irradiation with polarized ultraviolet light, and thus is used as a liquid crystal photo-alignment film (Patent Documents 10, 12 and 13).

Patent Document 1: JP-A-2006-285197
Patent Document 2: JP-A-5-232473
Patent Document 3: JP-A-2002-250924
Patent Document 4: JP-A-11-189665
Patent Document 5: JP-A-6-289374
Patent Document 6: JP-A-8-15681
Patent Document 7: JP-A-11-152475
Patent Document 8: JP-A-10-251646
Patent Document 9: JP-A-2002-258303
Patent Document 10: JP-A-2001-100214
Patent Document 11: JP-A-9-5747
Patent Document 12: JP-A-11-258611
Patent Document 13: JP-A-11-125821

However, in a case where a single layer of a silane coupling agent is used as disclosed in Patent Documents 10, 12 and 13, the alignment-regulating power changes depending upon the temporary alignment direction, and in order to align a chemisorbed film, a compound having a cinnamate or chalcone structure is used, whereby the light resistance tends to be inadequate.

Further, in addition to the above-mentioned problem relating to light resistance, conventional photo-alignment films have had a problem such that particularly in a case where liquid crystals having two or more polymerizable groups are aligned and polymerized, adhesion between the liquid crystal interface and the alignment film tends to be poor, thus leading to a problem in reliability or peeling due to deficient adhesion.

SUMMARY OF INVENTION

Therefore, it is an object of the present invention to impart a sufficient alignment-regulating power to a liquid crystal compound and further to improve laser light resistance at a wavelength of 405 nm, which used to be inadequate with conventional photo-alignment films, by means of a novel photo-alignment method.

Further, another object of the present invention is to sufficiently bond the liquid crystal alignment film of the present invention and a liquid crystal compound having an optical anisotropy by photopolymerizing the liquid crystal compound in a state aligned by the liquid crystal alignment film, thereby to provide an optical element having high reliability.

The liquid crystal alignment film of the present invention is characterized in that it is obtainable by bonding, by chemisorption to a surface of a substrate, an alignment-regulating precursor which undergoes anisotropic decomposition by irradiation with polarized ultraviolet light, and irradiating the alignment-regulating precursor bonded to the substrate, with polarized ultraviolet light, to let it undergo anisotropic decomposition and exhibit an alignment-regulating power.

Further, the process for producing a liquid crystal alignment film of the present invention is characterized in that it comprises a bonding step of contacting, to a substrate, a solution containing an alignment-regulating precursor which undergoes anisotropic decomposition by irradiation with polarized ultraviolet light, to bond the alignment-regulating precursor to the substrate by chemisorption, a cleaning step of cleaning the substrate with a solvent to remove the alignment-regulating precursor not bonded to the substrate, and a photo-alignment step of irradiating the alignment-regulating precursor bonded to the substrate, with polarized ultraviolet light, to let it undergo anisotropic decomposition and exhibit an alignment-regulating power.

The optical element of the present invention is characterized by having a polymerizable liquid crystal composition polymerized in a state showing a liquid crystal phase and in a state where liquid crystals are aligned, on the liquid crystal alignment film of the present invention.

The optical information writing/reading device of the present invention is an optical information writing/reading device to carry out recording of information on optical recording media and/or reproduction of information recorded on optical recording media, which is characterized by having the optical element of the present invention.

ADVANTAGEOUS EFFECTS OF INVENTION

By using the liquid crystal alignment film of the present invention, it is possible to impart a sufficient alignment-regulating power to a liquid crystal compound and present high transparency with little absorption of ultraviolet light, and thus to obtain an optical element which is excellent in light resistance and which has high reliability imparted by sufficient adhesion between the liquid crystal alignment film and the liquid crystal compound.

The optical element prepared by using the above liquid crystal alignment film is one to satisfy both light resistance and reliability and thus is useful for pickup elements, imaging elements, communication devices, etc. and particularly suitable for Blu-ray applications.

DETAILED DESCRIPTION OF PREFERRED EMBODIMENTS

Figure 1:
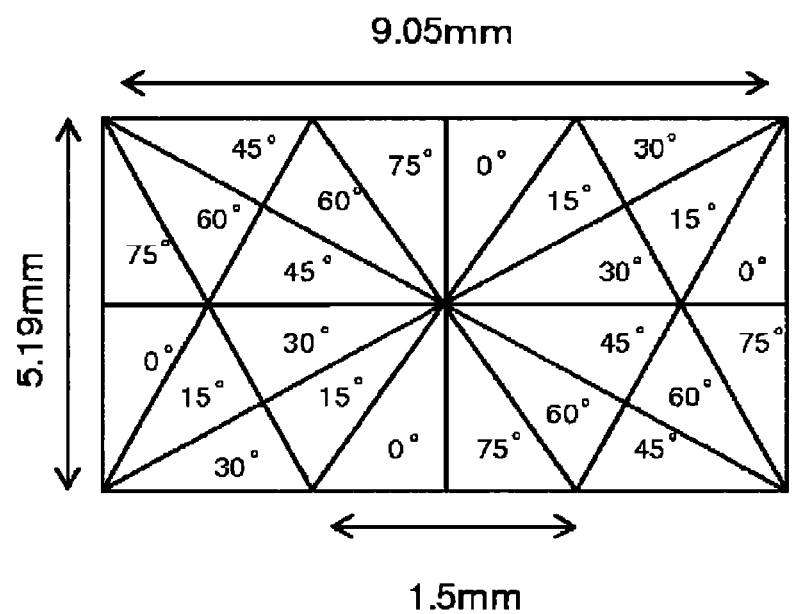
FIG. 1 is a diagram illustrating a multidomain alignment pattern of a liquid crystal alignment film prepared in Example 7-1.

The liquid crystal alignment film in this specification, is one obtainable by bonding a specific alignment-regulating precursor on a substrate and irradiating the alignment-regulating precursor with polarized ultraviolet light to impart the alignment-regulating power.

The alignment-regulating precursor to be used here, may, for example, be a compound represented by the following formula (1) or (2):

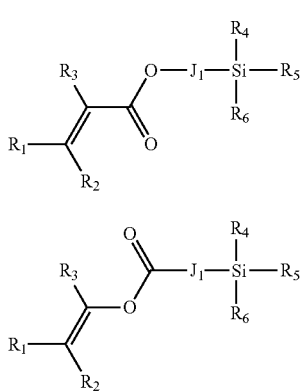

wherein each of $R_1$ to $R_3$ which are independent of one another, is a hydrogen atom or a methyl group, each of $R_4$ to $R_6$ which are independent of one another, is a chlorine atom, a hydroxy group or a $C_{1-3}$ alkyl group, provided that at least one of them is a chlorine atom or a hydroxy group, and $J_1$ is a straight chain or branched chain $C_{1-10}$ alkylene group or a group represented by —$(CH_2)_o$—X—$(CH_2)_p$—Y—$(CH_2)_q$— (wherein X is —O— or —NH—, Y is —O—, —NH— or a single bond, each of o and q is an integer of from 1 to 3 and p is an integer of from 0 to 3, provided that o+p+q is from 2 to 9). These compounds are silane coupling agents, characterized in that they have an olefin group adjacent to an ester bond. Here, in $J_1$, when Y is —O— or —NH—, p becomes from 1 to 3 without becoming 0.

With respect to $J_1$, as its chain length becomes long, the liquid crystal molecules tend to be vertically aligned, and therefore, in order to maintain good horizontal alignment, the chain length is preferably from 1 to 5, further preferably from 1 to 3. Further, it may have a branched chain to such an extent not to impair the alignment and to maintain the horizontal alignment.

Among $R_4$ to $R_6$, at least one group is bonded to the substrate via oxygen. As the group to be bonded to the substrate, a chlorine atom or a hydroxy group may be mentioned, and such a group is reacted with a hydroxy group on the substrate to form a SiO bond thereby to be fixed on the substrate. The remaining groups not bonded to the substrate are preferably $C_{1-3}$ alkyl groups with a view to not hindering chemisorption to the substrate.

More specifically, the compound of the formula (1) is preferably a compound represented by the following formula (A):

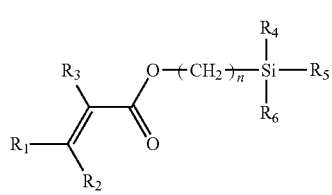

In the formula (A), combinations of $R_1$ to $R_6$ and n are shown in Table 1.

TABLE 1

| Compound No. | $R_1$ | $R_2$ | $R_3$ | $R_4$ | $R_5$ | $R_6$ | n |
|---|---|---|---|---|---|---|---|
| A1 | H | H | $CH_3$ | OH | OH | OH | 3 |
| A2 | H | H | $CH_3$ | OH | OH | $CH_3$ | 3 |
| A3 | H | H | $CH_3$ | OH | $CH_3$ | $CH_3$ | 3 |
| A4 | H | H | $CH_3$ | OH | OH | OH | 1 |
| A5 | H | H | $CH_3$ | OH | OH | $CH_3$ | 1 |
| A6 | H | H | $CH_3$ | OH | $CH_3$ | $CH_3$ | 1 |

Here (in Table 1), chemical structures after hydrolysis are shown. Hereinafter, structures before hydrolysis will also be represented by the same compound No., unless otherwise specified. Here, a group before hydrolysis may be an alkoxy group to form a hydroxy group by hydrolysis, such as —$OCH_3$ or —$OC_2H_5$. Here, a hydroxy group is mentioned as an example of the group for chemisorption to the substrate, but chemisorption to the substrate may be carried out by a chlorine atom or the like without being particularly limited to a hydroxy group. The same applies to other alignment-regulating precursors which will be described hereinafter.

Now, another alignment-regulating precursor to be used in the present invention may, for example, be a compound represented by the following formula (3) or (4):

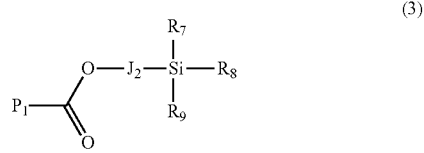

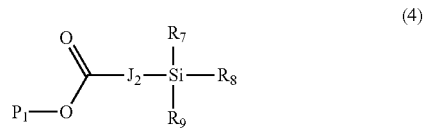

wherein $P_1$ is a phenyl or biphenyl group which is unsubstituted or substituted by a substituent selected from an alkyl group and an alkoxy group, each of $R_7$ to $R_9$ which are independent of one another, is a chlorine atom, a hydroxy group or a $C_{1-3}$ alkyl group, provided that at least one of them is a chlorine atom or a hydroxy group, and $J_2$ is a straight chain or branched chain $C_{1-10}$ alkylene group or a group represented by —$(CH_2)_o$—X—$(CH_2)_p$—Y—$(CH_2)_q$— (wherein X is —O— or —NH—, Y is —O—, —NH— or a single bond, each of o and q is an integer of from 1 to 3 and p is an integer of from 0 to 3, provided that o+p+q is from 2 to 9). These compounds are silane coupling agents which are characterized in that they have a phenyl group or a biphenyl group adjacent to an ester bond. Here, in $J_2$, when Y is —O— or —NH—, p becomes from 1 to 3 without becoming 0.

With respect to $J_2$, as its chain length becomes long, liquid crystal molecules tend to be vertically aligned, and therefore, in order to maintain good horizontal alignment, the chain length is from 1 to 10, preferably from 1 to 5, further preferably from 1 to 3. Further, it may have a branched chain to such an extent not to impair the alignment and to maintain the horizontal alignment.

Here, $P_1$ is a phenyl or biphenyl group and one or more hydrogen atoms in such a phenyl or biphenyl group may be substituted by a substituent to such an extent not to impair the alignment of liquid crystals and to maintain horizontal alignment. Such a substituent may, for example, be a $C_{1-5}$, preferably $C_{1-3}$, alkyl group or a $C_{1-5}$, preferably $C_{1-3}$, alkoxy group. In a case where a hydrogen atom in such an aromatic ring is substituted by an alkyl group or an alkoxy group, if the carbon chain becomes long, vertical alignment will be induced, and therefore the chain is preferably short i.e. the number of carbon atoms is from 1 to 5, preferably from 1 to 3. Further, from the viewpoint of light resistance, this $P_1$ is preferably a phenyl group with less absorption.

Among $R_7$ to $R_9$, at least one group is bonded to the substrate via oxygen. As such a group to be bonded to the substrate, a chlorine atom or a hydroxy group may be mentioned, and such a group is reacted with a hydroxy group on the substrate to form a SiO bond thereby to be fixed on the substrate. The remaining groups not bonded to the substrate are preferably $C_{1-3}$ alkyl groups with a view to not hindering chemisorption to the substrate.

More specifically, the compound of the formula (3) is preferably a compound represented by the following formula (B):

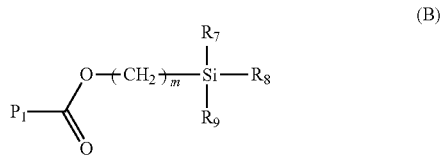

(B)

In the formula (B), combinations of $P_1$, $R_7$ to $R_9$ and m are shown in Table 2. Here, in Table 2, a phenyl group is represented by Ph, and a biphenyl group is represented by BiPh.

TABLE 2

| Compound No. | $P_1$ | $R_7$ | $R_8$ | $R_9$ | m |
|---|---|---|---|---|---|
| B1 | Ph | OH | OH | OH | 3 |
| B2 | Ph | OH | OH | $CH_3$ | 3 |
| B3 | Ph | OH | $CH_3$ | $CH_3$ | 3 |
| B4 | Ph | OH | OH | OH | 1 |
| B5 | Ph | OH | OH | $CH_3$ | 1 |
| B6 | Ph | OH | $CH_3$ | $CH_3$ | 1 |
| B7 | BiPh | OH | OH | OH | 3 |
| B8 | BiPh | OH | OH | $CH_3$ | 3 |
| B9 | BiPh | OH | $CH_3$ | $CH_3$ | 3 |
| B10 | BiPh | OH | OH | OH | 1 |
| B11 | BiPh | OH | OH | $CH_3$ | 1 |
| B12 | BiPh | OH | $CH_3$ | $CH_3$ | 1 |

Now, another alignment-regulating precursor to be used in the present invention may, for example, be a compound represented by the following formula (5):

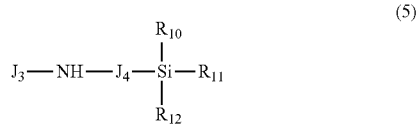

(5)

wherein each of $R_{10}$ to $R_{12}$ which are independent of one another, is a chlorine atom, a hydroxy group or a $C_{1-3}$ alkyl group, provided that at least one of them is a chlorine atom or a hydroxy group, $J_3$ is a $C_{1-4}$ alkyl group or a group having one or more carbon atoms in such a $C_{1-4}$ alkyl group substituted by nitrogen atom(s) and $J_4$ is a $C_{1-5}$ alkylene group or a group having one or more carbon atoms in such a $C_{1-5}$ alkylene group substituted by nitrogen atom(s). This compound is a silane coupling agent containing at least one nitrogen atom in a group bonded to Si in a straight chain form. Here, the length of the main chain in the group represented by $J_3$-NH-$J_4$- is preferably at most 10 in order to maintain the horizontal alignment.

Here, as $J_3$, the group having one or more carbon atoms in a $C_{1-4}$ alkyl group substituted by nitrogen atom(s) may, for example, be a group represented by —$(CH_2)_r$—$NH_2$ (wherein r is from 1 to 3) or —$CH_2$—NH—$CH_2$—$NH_2$, having the terminal methyl group substituted by an amino group, or a group represented by —$CH_2$—NH—$CH_3$, —$CH_2$—NH—$CH_2$—$CH_3$ or —$CH_2$—$CH_2$—NH—$CH_3$, having a terminal methyl group and having a methylene group in the chain substituted by an imino group (—NH—).

Further, as $J_4$, the group having one or more carbon atoms in a $C_{1-5}$ alkylene group substituted by nitrogen atom(s) may, for example, be a group represented by —$(CH_2)_s$—NH—$(CH_2)_t$— (wherein each of s and t is an integer of from 1 to 3, provided that s+t=2 to 4) or a group represented by —$CH_2$—NH—$CH_2$—NH—$CH_2$—, having one or more methylene groups substituted by imino group(s).

In $J_3$ and $J_4$, as the length of the alkyl group becomes long, the liquid crystal molecules tend to be vertically aligned, and therefore, in order to maintain good horizontal alignment, $J_3$ and $J_4$ are preferably a $C_{1-3}$ alkyl group and a $C_{1-3}$ alkylene group, respectively. Further, from the viewpoint of the adhesion, $J_3$ preferably contains at least one nitrogen atom.

Among $R_{10}$ to $R_{12}$, at least one group is bonded to the substrate via oxygen. As the group to be bonded to the substrate, a chlorine atom or a hydroxy group may be mentioned, and such a group is reacted with a hydroxy group on the substrate to form a SiO bond thereby to be fixed on the substrate. The remaining groups not bonded to the substrate are preferably $C_{1-3}$ alkyl groups with a view to not hindering chemisorption to the substrate.

More specifically, the compound of the formula (5) is preferably a compound represented by the following formula (C):

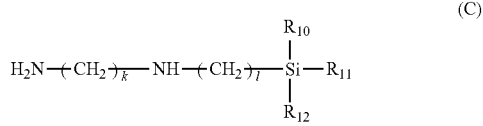

(C)

In the formula (C), combinations of $R_{10}$ to $R_{12}$, k and l are shown in Table 3.

TABLE 3

| Compound No. | $R_{10}$ | $R_{11}$ | $R_{12}$ | k | l |
|---|---|---|---|---|---|
| C1 | OH | OH | $CH_3$ | 2 | 3 |
| C2 | OH | OH | OH | 2 | 3 |
| C3 | OH | OH | OH | 1 | 3 |

The liquid crystal alignment film of the present invention contains at least one compound selected from the compounds represented by the formulae (1) to (5), and such a compound to be used here is contained in an amount of preferably at least 50 mol %, more preferably at least 70 mol %, in the compounds constituting the liquid crystal alignment film with a view to inducing photodecomposition in the film on the substrate thereby to provide a sufficient alignment-regulating power, when irradiated with polarized ultraviolet light.

Another alignment-regulating precursor to be used as mixed with any one of the compounds of the formulae (1) to (5), may, for example, be a compound represented by the following formula (D):

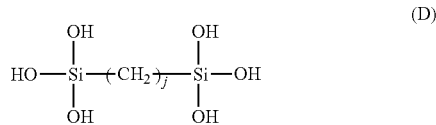

wherein j is an integer of at least 1. The skeleton of this compound itself is poor in photodecomposition, but by adding this compound to any one of the compounds of the formulae (1) to (5), it is possible to improve in-plane optical axis distribution, such being desirable. The amount of this compound to be added is at most 50 mol %, more preferably at most 30 mol %, in the compounds constituting the liquid crystal alignment film. This structure is preferred also with a view to improving horizontal alignment, since adsorption to the substrate is carried out at both terminals. Further, j is preferably from 1 to 10 with a view to maintaining the horizontal alignment of the alignment film.

Now, the process for producing a liquid crystal alignment film using the above compound will be described.

Firstly, a bonding step of contacting, to a substrate, a solution containing an alignment-regulating precursor which undergoes anisotropic decomposition by irradiation with polarized ultraviolet light, to bond the alignment-regulating precursor to the substrate by chemisorption, is carried out.

In this bonding step by chemisorption, a compound (a silane coupling agent) represented by one of the above formulae (1) to (5) is dissolved and mixed in a solvent to form a solution, which is, after sufficiently hydrolyzing the silane coupling agent, contacted to a substrate to bond the silane coupling agent to the substrate by chemisorption. The contact of the solution to the substrate may be carried out by a method such as dip coating or spin coating, followed by heating at a temperature of from 40 to 200° C. to form a coating film. The thickness of the coating film is usually from 1 to 100 nm, preferably from 1 to 20 nm.

The solvent to be used here may be any solvent so long as it is capable of dissolving the alignment-regulating precursor of the formula (1) to (5) and may be a solvent of aqueous type or non-aqueous type. Further, in a case where the reactive group of the alignment-regulating precursor is Si—Cl, such a compound will not be hydrolyzed and the reaction will proceed simply by its contact with the substrate, and therefore a non-aqueous type solvent is preferred. However, even in the case of an aqueous solvent, the reactive group Si—Cl becomes Si—OH, whereby bonding to the substrate is possible by a dehydration condensation reaction by heat treatment, and there will be no problem. Here, as the solvent, for example, a non-aqueous solvent may, for example, be toluene, xylene or N-methylpyrrolidone, and an aqueous solvent may, for example, be an acetic acid aqueous solution/alcohol mixture system.

Here, the substrate is a substrate which is commonly used for a liquid crystal display element or an optical anisotropic body and is not particularly limited so long as it is a material having heat resistance durable to heating at the time of drying after coated with the alignment-regulating precursor or at the time of producing a liquid crystal element. As such a substrate, a transparent substrate is preferred, and for example, it is possible to employ a substrate made of a material having a high transmittance to light within a range of from ultraviolet light to visible light. Specifically, inorganic glass such as alkali glass, alkali-free glass, quartz glass, etc. may be mentioned. Further, the substrate is not limited to the above glass so long as it is capable of being bonded to the silane coupling agent by chemisorption, and it may be a transparent substrate made of a plastic such as polyethylene terephthalate or polycarbonate.

Further, in the bonding step by chemisorption, in order to sufficiently bond the silane coupling agent to the substrate, it is preferred to carry out heating to a level of from 70 to 200° C. during the step or after the step. Further, the alignment-regulating precursor may simply be required to be bonded to the substrate, and it may be bonded directly or via another molecule, etc.

Then, a cleaning step of cleaning the substrate with a solvent to remove the alignment-regulating precursor not bonded to the substrate, is carried out. As the solvent to be used in this cleaning step, an organic solvent such as toluene, xylene or N-methylpyrrolidone is preferred with a view to improving the uniformity of the film, and N-methylpyrrolidone is more preferred, since the cleaning effect is higher. While supplying the solvent to the substrate surface, the solvent is permitted to flow on the surface, whereby a free alignment-regulating precursor not bonded will be removed from the substrate surface and cleaned off.

The film to be obtained at that time should preferably be as thin as possible from the viewpoint of light resistance. In the present invention, the film thickness is preferably at most 100 nm, more preferably at most 20 nm. Further, it may be a monomolecular film, and this film is bonded at its lower surface to the substrate by chemisorption.

After the cleaning, a photo-alignment step is carried out by irradiating the alignment-regulating precursor bonded to the substrate, with polarized ultraviolet light, to let it undergo anisotropic decomposition and exhibit an alignment-regulating power. At that time, the polarized ultraviolet light preferably contains ultraviolet ray having a wavelength of from 254 nm to 365 nm, with a view to facilitating photodecomposition and improving the alignment-regulating power. The polarized ultraviolet light to be used here may be either linearly-polarized light or elliptically-polarized light, but in order to carry out alignment-regulating efficiently, it is preferred to employ linearly-pluralized light having a high extinction ratio.

When the liquid crystal alignment film of the present invention is irradiated with the above polarized ultraviolet light, molecular chains will be cut or broken with respect to molecules disposed in a direction along the polarization direction, among the alignment-regulating precursor molecules of the formula (1) to (5) bonded to the substrate. On the other hand, molecules in a direction intersecting with the polarization direction will be less affected. Consequently, the compound bonded to the substrate will have anisotropy and exhibits the alignment-regulating power.

Further, in the present invention, as described above, the alignment-regulating power is provided by photodecomposition by means of polarized ultraviolet light, but the compound represented by the above formula (1) to (5) is used wherein the amount of groups to absorb such ultraviolet light is reduced, whereby it has been made possible to suppress absorption of ultraviolet light to a level close to the lowest limit. Further, when the film to be formed is made thin as mentioned above, it is possible to obtain a liquid crystal alignment film which is excellent in weather resistance and alignment and which is excellent also in adhesion.

Further, the quantity of polarized ultraviolet light to be irradiated here is preferably from 1,680 mJ/cm$^2$ to 16,800 mJ/cm$^2$, more preferably from 5,040 mJ/cm$^2$ to 13,440 mJ/cm$^2$, particularly preferably from 8,400 mJ/cm$^2$ to 13,440 mJ/cm$^2$. When the irradiation with such polarized ultraviolet light is at least 1,680 mJ/cm$^2$, the alignment-regulating power can sufficiently be provided, and when it is at most 16,800 mJ/cm$^2$, the horizontal alignment of liquid crystals and the adhesion will be good.

Now, a method for preparing a multidomain alignment pattern using the present invention will be described. In the present invention, in a film formed of the alignment-regulating precursor, the alignment-regulating power will be formed only in a domain irradiated with polarized ultraviolet light, and accordingly, by using light shielding masks having different openings, it is possible to prepare an alignment pattern having a plurality of optical axis directions. As such a light shielding mask, one having metal such as Cr vapor-deposited on a quartz substrate is preferred in that short wavelength ultraviolet light is also permitted to pass therethrough.

Further, to define the optical axis direction, as the alignment direction is determined by irradiation at a desired angle of the irradiation direction of polarized ultraviolet light, the surface of the substrate may be divided into a plurality of domains, and at every domain, polarized ultraviolet light is applied from a predetermined direction by means of the above-mentioned light shielding mask to impart a predetermined different alignment-regulating power at every domain thereby to prepare a multidomain alignment pattern. In the present invention, the alignment-regulating power is formed by photodecomposition of the film, and the long axis direction of liquid crystals will be aligned in a direction orthogonal at 90° to the direction irradiated with polarized ultraviolet light, and thus, by adjusting the irradiation angle, it is possible to control the alignment direction to a desired direction.

Further, in a case where two substrates are used to form a cell, misalignment in lamination to form a cell is likely to occur, and therefore, after preparing the liquid crystal cell, light shielding masks are put on the cell, and polarized ultraviolet light may be applied in optional directions through the cell. However, at the time of applying polarized ultraviolet light through the cell, resolution by the pattern may decrease depending upon the thickness of the upper substrate. Therefore, at the time of preparing fine patterns of at most 100 μm, it is necessary to apply polarized ultraviolet light not through the cell but by bringing the light shielding masks close to one substrate.

At the time of preparing different alignment patterns at a plurality of domains as described above, the corresponding number of light shielding masks having different openings, are used. Otherwise, to a site once irradiated with polarized ultraviolet light, rewriting may be carried out by changing the irradiation angle, although offset is required. The method for producing a liquid crystal alignment film by rewriting is preferably a method wherein in the photo-alignment step, after the substrate is irradiated with polarized ultraviolet light from a predetermined direction, the region irradiated with polarized ultraviolet light is again partially irradiated with polarized ultraviolet light from predetermined directions to impart different alignment-regulating powers.

At the time of carrying out such rewriting, a step of overlaying light shielding masks can be omitted, and thus there is a merit from the viewpoint of the productivity. That is, in order to change the alignment pattern for every domain by means of a light shielding mask, an operation to overlay a light shielding mask is required depending upon the number of domains of alignment patterns. The overlaying operation not only increases process steps for the production, but also requires high precision in alignment at the time of forming fine patterns.

On the other hand, in a case where the entire surface of the substrate coated with the alignment-regulating precursor, is irradiated with a polarized ultraviolet light to induce anisotropic decomposition over the entire surface of the substrate, and then rewriting is carried out by placing light shielding masks to change alignment in optional alignment domains, fine alignment patterns can easily be formed even if precision in position adjustment of shielding masks is not high.

Further, in a case where a cell is prepared so that the surfaces of the substrates on which the present alignment film is formed, face to each other, if a multidomain pattern is prepared by using a substrate having one side rubbed in one direction and applying photo-alignment treatment to the other substrate, it is possible to realize a multidomain pattern having liquid crystals twisted.

Now, an optical element of the present invention will be described. The optical element of the present invention is formed by using one substrate having the above-described liquid crystal alignment film of the present invention formed thereon or two such substrates with liquid crystal alignment films facing each other, and polymerizing a polymerizable liquid crystal composition in a state showing a liquid crystal phase and in a state where liquid crystals are aligned, on the liquid crystal alignment film.

The case of producing an optical element by using two substrates will be described. Firstly, a spacer is sprayed on photo-alignment-treated substrates (liquid crystal alignment films), and the substrates are bonded by a sealing material so that the alignment-treated surfaces face each other, thereby to form a liquid crystal cell, whereupon a polymerizable liquid crystal composition is injected between the substrates.

As the polymerizable liquid crystal composition to be used here, specifically, a photocurable polymer liquid crystal containing an acrylic group or a methacrylic group, may, for example, be mentioned. A constituting component of the polymerizable liquid crystal composition to be used may not show a nematic phase by itself, but is acceptable so long as it can be made into a polymerizable liquid crystal composition.

At that time, a polymerizable non-liquid crystal compound, additives, etc. may be added to the polymerizable liquid crystal composition, as the case requires. The additives include, for example, a polymerization initiator, a polymerization inhibitor, a chiral agent, an ultraviolet absorber, an antioxidant, a photostabilizer, a dichromatic dye, etc.

In order to maintain this polymerizable liquid crystal composition in a state to show a liquid crystal phase, the ambient temperature may be made to be at most the nematic phase-isotropic phase transition temperature (Tc). However, at a temperature close to Tc, Δn of the polymerizable liquid crystal composition becomes extremely small, and therefore, the upper limit of the ambient temperature is preferably at most (Tc-10)° C. Here, Δn is the difference in refractive index between the long axis direction and the short axis direction of liquid crystal.

For the polymerization of the polymerizable liquid crystal composition, photopolymerization or thermal polymerization may, for example, be mentioned, but photopolymerization is preferred in that it is thereby easy to carry out curing while maintaining the liquid crystallinity. Light to be used for photopolymerization is preferably ultraviolet light or visible light. Further, in a case where photopolymerization is carried out, it is preferred to employ a photopolymerization initiator, and for example, a photopolymerization initiator is preferably employed which is suitably selected from e.g. acetophenones, benzophenones, benzoins, benzyls, Michler ketones, benzoin alkylethers, benzylmethylketals and thioxanthones. Such photopolymerization initiators may be used alone or in combination as a mixture of two or more of them. The amount of the photopolymerization initiator is preferably from 0.01 mass % to 5 mass %, particularly preferably from 0.01 mass % to 2 mass %, based on the total amount of the polymerizable liquid crystal composition.

At that time, with respect to the temperature for injection of the polymerizable liquid crystal composition, it is preferred to carry out the injection at a temperature of at least the isotropic phase temperature where no liquid crystal phase is exhibited, from the viewpoint of not disturbing the alignment.

Further, instead of preparing a liquid crystal cell, the polymerizable liquid crystal composition diluted with a solvent may be applied by die coating or spin coating on a photoalignment-treated single substrate to form a film.

In the present invention, the alignment-regulating power is formed by photodecomposition of the film, whereby the long axis direction of liquid crystals is aligned in a direction orthogonal at 90° to the direction irradiated with polarized ultraviolet light.

As the polymerizable liquid crystal composition to be used, for example, an alicyclic polymerizable liquid crystal composition disclosed in JP-A-2009-120547 is preferred. When an alicyclic liquid crystal is employed, an optical element excellent in transparency and light resistance can be prepared.

Further, the phase transition temperature to an isotropic phase, of liquid crystal to be used, is at most 120° C., preferably at most 100° C. That is, at the time of forming liquid crystal into a film by means of the liquid crystal alignment film, injection of the isotropic phase contributes to suppression of alignment defects. When the phase transition temperature to an isotropic phase is proper, at the time of the film formation, the polymerizable liquid crystal composition will not be thermally cured before photocuring, such being desirable.

The optical element prepared by using the present liquid crystal alignment film, has both light resistance and reliability and thus can be effectively utilized for a pickup element, an imaging element, a communication device, etc. and is particularly suitable for a pickup element for Blu-ray applications wherein an irradiation density is particularly high.

However, the present invention is not limited thereto and may be used for various liquid crystal cells of e.g. a TN (Twisted Nematic) and STN (Super Twisted Nematic) type wherein transparent electrode-attached substrates employing the present liquid crystal alignment films are made into a sandwich structure, and as the case requires, the long axis of liquid crystal molecules can be continuously twisted from 0 to 360°, an IPS (In Plane Switching) type wherein electrodes are formed on one side of a substrate to apply an electric field in a direction parallel to the substrate, and a VA (Vertical Alignment) type wherein a nematic liquid crystal having a negative dielectric anisotropy is used.

Here, in a case where light emitted from a semiconductor laser light source is linearly polarized light in Y-axis direction, when it is passed through a half wavelength plate, it becomes light having linearly polarized light in Y-axis direction contained in linearly polarized light in X-axis direction. The half wavelength plate has a function to form a phase difference corresponding to a half wavelength to the wavelength of light emitted from a semiconductor laser light source, and in a case where as mentioned above, linearly polarized light in Y-axis direction enters, the polarized state of light passing through a half wavelength plate can be changed by adjusting the optical axis direction of the half wavelength plate. For example, when the optical axis of a half wavelength plate is disposed in parallel with a direction at 45° to Y-axis (the entering linearly polarized direction) in the XY plane, light passing through the half wavelength plate becomes substantially linearly polarized light in X-axis direction, but by changing this angle, the light can be made in a polarized state containing a linearly polarized component in X-axis direction and a linearly polarized component in Y-axis direction.

At that time, by changing the optical axis of the half wavelength plate for every optical region and adjusting the X-axis and Y axis intensities of the emitted polarized light, it is possible to depolarize the polarization of incident light. That is, if the phase difference is adjusted to be uniformly λ/2, and the liquid crystal optical axis is made random for every region, the emitted polarized light will be non-uniform. Thus, such an element will be a depolarization element whereby incoming light is polarized light, but outgoing light is depolarized.

Likewise in control of the transmittance, the light intensities in the X-axis direction and Y-axis direction of the outgoing polarized light are determined by the optical axis direction and retardation to an optional wavelength, of the retardation plate through which light passes. Based on the retardation and the wavelength distribution of polymer liquid crystal to be used for the retardation plate, by providing regions having different optical axis directions in the element, it is possible to control the outgoing polarized light transmittance different in every region and by taking the wavelength dispersion into consideration, it is possible to control the outgoing polarized light transmittance also in an optional wavelength region.

That is, if the phase difference and the optical axis of liquid crystal change, the transmittance of the outgoing polarized light changes. Therefore, while adjusting the phase difference to be uniform, the axis is changed to change the transmittance for every region. However, the phase difference of liquid crystal changes also depending upon the wavelength. Therefore, the transmittance changes for every wavelength. Therefore, depending upon at which wavelength, the transmittance is desired to be made high, the axis direction and the phase difference may be properly changed, and it is possible to design the transmittance for every region.

Further, the optical information writing/reading device of the present invention is one wherein the above-described optical element of the present invention is used as an optical element to be used to carry out recording of information on optical recording media and/or reproduction of information recorded on optical recording media.

EXAMPLES

Now, the present invention will be described in further detail with reference to Examples. Examples 1 to 4 and 7 to 10 are Examples of the present invention, and Examples 5 and 6 are Comparative Examples.

[Preparation of Polymerizable Liquid Crystal Composition]

The polymerizable liquid crystal composition used in Examples is shown below.

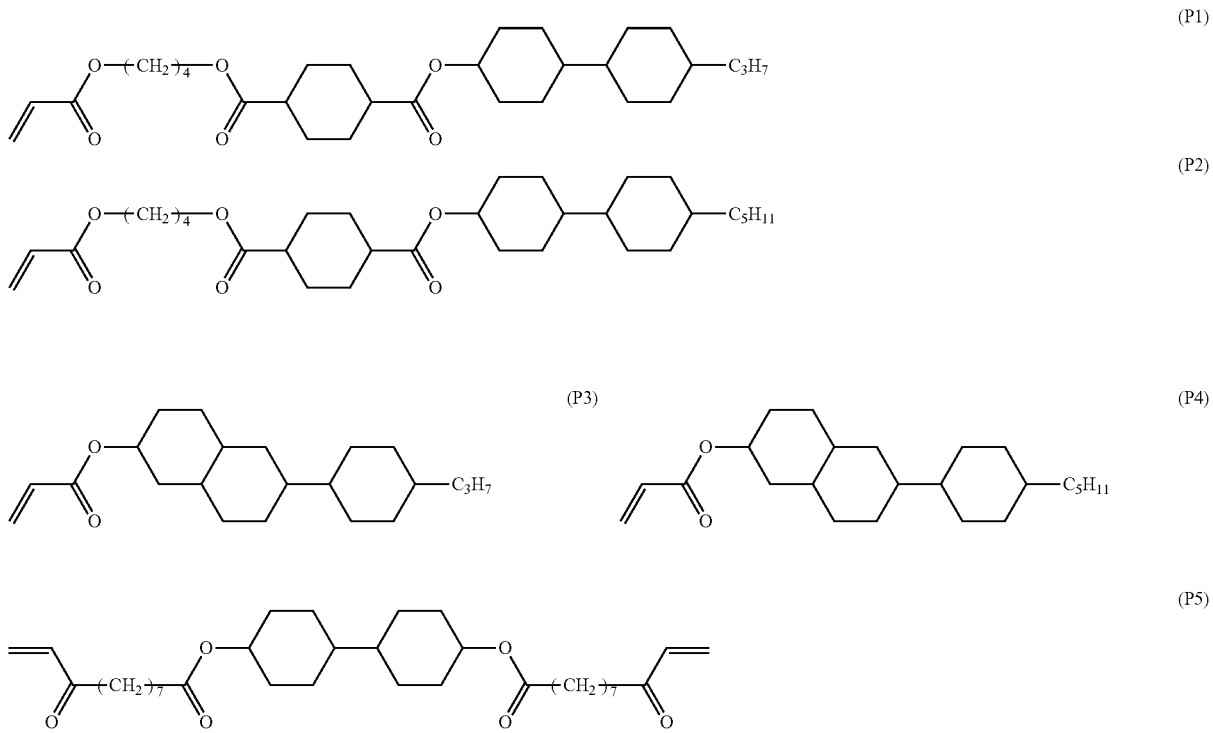

The thickness of the spacer was 5.3 μm in each case, and the exposure temperature at the time of carrying out photopolymerization was adjusted to be uniformly at 70° C. in all cases.

The polymerizable liquid crystal composition used here was one having the above-mentioned five types of polymerizable liquid crystal compounds (P1) to (P5) mixed in a ratio of (P1):(P2):(P3):(P4):(P5)=7.5:7.5:22.5:22.5:40 (molar ratio) as the compositional ratio of liquid crystal. Further, as a photopolymerization initiator, "DAROCUR TPO" (tradename), manufactured by Ciba Specialty Chemicals was used and added in an amount of 0.1 mass % to the polymerizable liquid crystal composition. This polymerizable liquid crystal composition will be hereinafter referred to as polymerizable liquid crystal composition A.

With respect to the above-mentioned liquid crystal compounds, (P1) and (P2) are compounds obtained by the production method disclosed in JP-A-2010-7031, (P3) and (P4) are compounds obtained by the production method disclosed in WO2009/148142, and (P5) is a compound obtained by the production method disclosed in WO2010/001868.

Example 1

Into a plastic container, an aqueous acetic acid solution having pH 4 was introduced, and compound (A1) as a silane coupling agent being an alignment-regulating precursor was dissolved so that the concentration became 1 mass %, followed by stirring at room temperature for 1 hour to sufficiently hydrolyze the solution. Thereafter, the hydrolyzed solution was diluted with isopropyl alcohol (IPA) to bring the concentration of the silane coupling agent to 0.05 mass % (hydrolysis step). Here, as compound (A1), KBM503 (tradename) manufactured by Shin-Etsu Chemical Co., Ltd. was used.

A 0.05 mass % solution obtained by dilution, was applied by spin coating to a 6-inch quartz substrate, followed by firing at 140° C. for 1 hour in an oven to bond the silane coupling agent to the substrate by chemisorption (bonding step).

N-methylpyrrolidone was supplied and permitted to flow on the surface of the substrate having the silane coupling agent bonded, to remove and clean off a non-bonded silane coupling agent (cleaning step).

After completion of the cleaning step, the substrate was irradiated with linearly polarized light by means of an ultraviolet ray polarization and exposure apparatus (tradename: HC-1001, manufactured by Yamashita Denso Corporation). As the amount of light, the irradiated amount of 365 nm was 8,400 mJ (5 minutes irradiation) as cumulative amount of light, and a liquid crystal alignment film was obtained (photoalignment step).

In order to maintain the film thickness to be constant, a spacer was sprayed on the surface of the substrate having the silane coupling agent bonded, and then, seal printing was carried out, and a cell was formed by two substrates (cell-forming step).

After forming the cell, between the substrates, the polymerizable liquid crystal composition A was injected by a vacuum injection method, and the polymerizable liquid crystal composition between the substrates was irradiated with ultraviolet light of 365 nm for 9,000 mJ to photopolymerize the liquid crystal composition, followed by baking at 135° C. for 30 minutes (baking step) to obtain an optical element.

Example 2

Into a plastic container, an aqueous acetic acid solution having pH 4 was introduced, and a mixture of compound (A1):compound (D1, j=6)=9:1 (mass ratio), as a silane coupling agent being an alignment-regulating precursor, was dissolved so that the concentration became 1 mass %, followed by stirring at room temperature for 1 hour to sufficiently hydrolyze the solution. Thereafter, the hydrolyzed solution was diluted with isopropyl alcohol (IPA), so that the concentration of the silane coupling agent was made to be 0.05 mass % (hydrolysis step). Here, as compound (D1), SIB1832.7 (tradename) manufactured by Gelest was used.

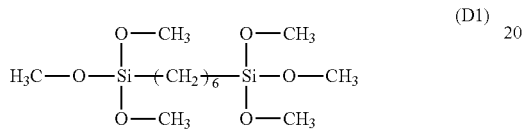

(D1)

By using a 0.05 mass % solution obtained by dilution, in the same manner as in Example 1, "bonding step" and then "cleaning step", "photo-alignment step", "cell-forming step" and "baking step" were carried out to obtain an optical element.

Example 3

Into a plastic container, a mixed solvent of an acetic acid aqueous solution having pH 3:IPA=1:1 (volume ratio) was introduced, and compound (B1) as a silane coupling agent being an alignment-regulating precursor was dissolved so that the concentration became 1 mass %, followed by stirring at room temperature for 1 hour to sufficiently hydrolyze the solution. Thereafter, the hydrolyzed solution was diluted with isopropyl alcohol (IPA) to bring the concentration of the silane coupling agent to 0.05 mass % (hydrolysis step). Here, as compound (B1), SIB0959.0 (tradename) manufactured by Gelest was used.

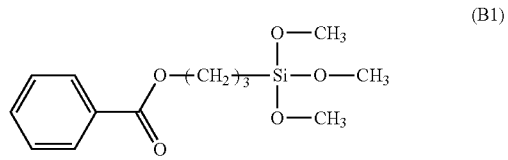

(B1)

By using a 0.05 mass % solution obtained by dilution, in the same manner as in Example 1, "bonding step" and then "cleaning step", "photo-alignment step", "cell-forming step" and "baking step" were carried out to obtain an optical element.

Example 4

Into a plastic container, an acetic acid aqueous solution having pH 4 was introduced, and compound (C1) as a silane coupling agent being an alignment-regulating precursor was dissolved so that the concentration became 1 mass %, followed by stirring at room temperature for 1 hour to sufficiently hydrolyze the solution. Thereafter, the hydrolyzed solution was diluted with isopropyl alcohol (IPA) to bring the concentration of the silane coupling agent to 0.05 mass % (hydrolysis step). Here, as compound (C1), KBM603 (tradename) manufactured by Shin-Etsu Chemical Co., Ltd. was used.

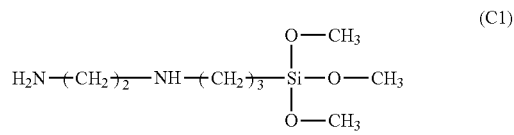

(C1)

By using a 0.05 mass % solution obtained by dilution, in the same manner as in Example 1, "bonding step" and then "cleaning step", "photo-alignment step", "cell-forming step" and "baking step" were carried out to obtain an optical element.

Example 5

Photodecomposition of Polyimide

As a commercially available polyimide film, LX-5800 manufactured by Hitachi Chemical Co., Ltd. was diluted with N-methylpyrrolidone to be 40 mass % and applied by spin coating to a 6-inch quartz substrate, followed by firing at 300° C. for 30 minutes.

In the same manner as in Example 1, the polyimide film-attached substrate was subjected to "photo-alignment step", "cell-forming step" and "baking step" to obtain an optical element.

Example 6

Into a plastic container, an aqueous acetic acid solution having pH 4 was introduced, and compound (D1) as a silane coupling agent being an alignment-regulating precursor was dissolved so that the concentration became 1 mass %, followed by stirring at room temperature for 1 hour to sufficiently hydrolyze the solution. Thereafter, the hydrolyzed solution was diluted with isopropyl alcohol (IPA) to bring the concentration of the silane coupling agent to 0.05 mass % (hydrolysis step).

By using the 0.05 mass % solution obtained by dilution, in the same manner as in Example 1, "bonding step" and then, "cleaning step", "photo-alignment step", "cell-forming step" and "baking step" were carried out to obtain an optical element.

Test Example

With respect to the optical elements obtained in Examples 1 to 6, the properties with respect to the alignment and adhesion of the substrate were confirmed. For the confirmation of the alignment, the degree of schlieren alignment defects was confirmed by means of a polarizing microscope and judged by the following standards. A case where alignment defects of at least 10 μm were not substantially observed, was judged to be ○ (good), and a case where such defects were substantially observed was judged to be x (no good).

For the confirmation of adhesion, the substrate was cut by a dicer, whereby the presence or absence of peeling between the polymer liquid crystal and the substrate was visually confirmed and judged based on the following standards. A case where peeling was not observed was judged to be ○ (good), and a case where peeling was observed, was judged to be x (no good).

The test results of the alignment and adhesion are summarized in Table 4.

TABLE 4

|  | Alignment | Adhesion |
|---|---|---|
| Ex. 1 | ○ | ○ |
| Ex. 2 | ○ | ○ |
| Ex. 3 | ○ | ○ |
| Ex. 4 | ○ | ○ |
| Ex. 5 | ○ | x |
| Ex. 6 | x | x |

Even in the case of the material having high transparency with less absorption of ultraviolet light, it was found that when the material was irradiated with polarized ultraviolet light having a strong spectrum at from 254 nm to 365 nm, the long axis direction of liquid crystals was aligned in a direction orthogonal at 90° to the irradiation direction.

Further, with respect to the alignment, symbol ○ was put to a case where it was judged that the optical axis direction of liquid crystals was controlled, and no substantial alignment defects were observed under a polarizing microscope. Even by the photodecomposition of a polyimide, a high alignment-regulating power was shown, but with the composition containing a crosslinkable acrylate substantially, peeling was observed at the time of cutting, and it was hardly said to be sufficient adhesion.

Example 7-1

Preparation of Multidomain Alignment Pattern

A liquid crystal alignment film was produced under the same conditions as in Example 2 except that in the photo-alignment step, the irradiation direction was changed to form a multidomain alignment pattern. The multidomain alignment pattern was made to be a pattern shown in FIG. 1 which is effective for depolarization at 405 nm.

As the liquid crystal used, polymerizable liquid crystal composition A was used. The size of the element was 5.19 mm×9.05 mm, and in such an element, liquid crystals were aligned by changing the irradiation direction of polarized ultraviolet light by means of Cr masks so that the long axis direction of liquid crystals became 0°, 15°, 30°, 45°, 60° and 75° (the angle of the long axis direction was determined by a direction of the alignment angle of the long axis direction of liquid crystals, based on that when the substrate was viewed from its plane direction the angle of liquid crystals aligned in an optical directions is regarded to be 0°). Here, the respective domains were disposed to have equal areas. It was confirmed that when the thickness was adjusted to bring retardation at 405 nm to be λ/2, it is possible to prepare an optical element having a depolarization ability.

Example 7-2

Preparation of Multidomain Alignment Pattern by Rewriting

Figure 2:
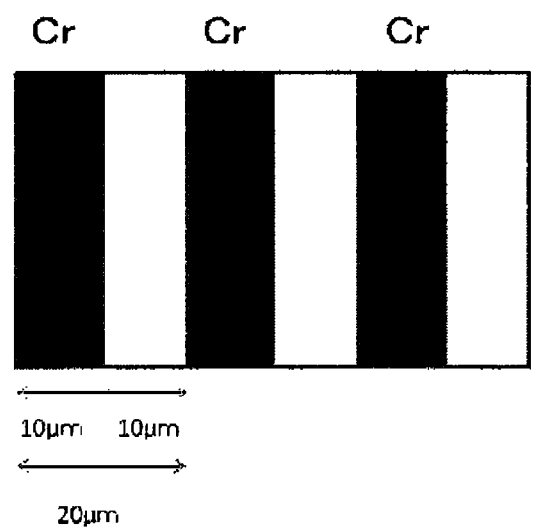
FIG. 2 is a diagram illustrating a multidomain alignment pattern of a liquid crystal alignment film prepared in Example 7-2.

A liquid crystal alignment film was produced by a rewriting system. The multidomain alignment pattern was a line/space binary pattern as shown in FIG. 2. In FIG. 2, as an example, a 20 μm line/space pattern is shown. As the line/space pattern, 8 patterns of 20 μm, 16 μm, 14 μm, 10 μm, 8 μm, 5 μm, 4 μm and 3 μm were used.

Up to the cleaning step, the operation was carried out in the same manner as in Example 1, and then, the entire surface of the substrate was irradiated with polarized ultraviolet light by means of a polarized UV beam exposure apparatus. The amount of light was adjusted so that the irradiated amount at 365 nm became 8,400 mJ (5 minutes irradiation) as cumulative amount of light. Then, a Cr mask as shown in FIG. 2 was placed on the substrate, and only the domains in which the alignment is to be changed, were irradiated with polarized ultraviolet light so that the irradiated amount at 365 nm became 10,800 mJ (6 minutes irradiation) as cumulative amount of light, to obtain a liquid crystal alignment film.

With respect to the irradiation direction, the first irradiation was carried out so that the long axis direction of liquid crystals became 0°, and the second irradiation for rewriting was carried out so that the long axis direction of liquid crystals became 50° C. On the obtained liquid crystal alignment film, the polymerizable liquid crystal composition A diluted with cyclohexanone was applied by spin coating, dried at 80° C. for 5 minutes and then irradiated with ultraviolet light of 365 nm for 9,000 mJ in a nitrogen atmosphere to photopolymerize the liquid crystal composition.

It was confirmed that the alignment pattern tended to be blurred when it was 4 μm or less, while with a line/space of 5 μm or more, only at the rewritten portions, the alignment changed, and a binary domain alignment pattern reflecting the Cr mask pattern was formed. Fine multidomain alignment patterns can be well produced by this method of "rewriting".

Example 8

Light Resistance Test

An optical element was produced under the same conditions as in Example 2 However, the conditions for irradiation of polarized ultraviolet light were changed so that the luminance was 28 mW/cm$^2$ and the irradiation time was 30 seconds, 1 minute, 3 minutes, 5 minutes and 10 minutes, to prepare five samples (they were sequentially designated as Examples 8-1 to 8-5). The obtained samples were cut into an element size of 3 mm×4 mm and put into LD laser of 405 nm. The irradiation density was 600 mW/mm$^2$. The irradiation time was 1,000 hours. The judgment for deterioration was made on such a basis that a change in transmittance should not exceed 2%.

For comparison, the optical element prepared by the polyimide in Example 5 was likewise cut into an element size of 3 mm×4 mm and put into LD laser of 405 nm. With respect to the transmittance, the transmittance of 409 nm was measured Example 8-6: Comparative Example The substrate had an antireflection film in a wavelength region of 405 nm vapor-deposited thereon.

The change rate in transmittance between before and after LD laser irradiation was measured, and the results are shown in Table 5.

TABLE 5

| | Irradiated amount of polarized light | Alignment film used | Initial transmittance | Transmittance after 200 hours | Transmittance after 1,000 hours | Change rate |
|---|---|---|---|---|---|---|
| Ex. 8-1 | 840 mJ | Ex. 2 | 99.0% | 98.6% | 98.6% | 0.4% |
| Ex. 8-2 | 1680 mJ | Ex. 2 | 99.2% | 98.9% | 98.8% | 0.4% |
| Ex. 8-3 | 5040 mJ | Ex. 2 | 99.2% | 98.9% | 98.9% | 0.3% |
| Ex. 8-4 | 8400 mJ | Ex. 2 | 99.0% | 98.6% | 98.2% | 0.8% |
| Ex. 8-5 | 16800 mJ | Ex. 2 | 99.1% | 98.4% | 97.8% | 1.3% |
| Ex. 8-6 | 5040 mJ | Ex. 5 | 97.2% | Irradiation taint observed No further irradiation possible | — | — |

It was confirmed that when the alignment film of the present invention was used, no substantial change in transmittance was observed for 1,000 hours even when irradiated with LD laser of 405 nm to be used for Blu-ray at an illuminance of 600 mW/mm$^2$, and even with a sample irradiated with polarized ultraviolet light for 10 minutes at the time of photo-alignment, the decrease of transmittance was suppressed to a level of 1.3%.

With the conventional photo-alignment material, certain absorption was observed at 405 nm, and it was found that the light resistance was low under such a condition that irradiation was carried out for a long time with high luminance laser like 600 mW/mm$^2$ with LD laser of 405 nm.

Example 9

Reliability Tests

The optical element prepared in Example 8-4 was subjected to reliability tests. As conditions for the reliability tests, a high temperature test at 85° C., a low temperature test at −40° C., a high temperature high humidity test at 60° C. under a humidity of 90%, and a heat cycle test of repeating −40° C. for 30 minutes and 85° C. for 30 minutes, were carried out. In each test, a sample of the optical element was put for 500 hours, and a change in transmittance and a change in retardation between before and after the test were examined to confirm the physical changes for reliability.

As a result, in all reliability tests carried out, no peeling between the substrate and the polymer liquid crystal was observed after the tests, the change in transmittance was at most 0.5%, and the change in retardation was at most 2 deg, and thus it was confirmed that the optical element was excellent in reliability.

Example 10

Change in Film State Between Before and after Irradiation with Polarized Ultraviolet Light Using a Cr substrate as the substrate, compound (A1) was applied by spin coating on the substrate, followed by irradiation with polarized ultraviolet light. Irradiation with polarized ultraviolet light was carried out by changing the condition to be no irradiation (0 minute), 30 minutes and 60 minutes, and as between before and after irradiation with polarized ultraviolet light, how the silane coupling agent on the substrate underwent photodecomposition, was measured. The measurement was carried out by measuring the IR spectrum by a highly sensitive reflection IR method in order to measure the thin film on the substrate with good sensitivity. Further, compound (B1) was formed into a film by the same process, and its IR spectrum was measured before and after irradiation with polarized ultraviolet light.

With respect to each compound, it was found that the peak attributable to an ester gradually disappeared as the time for irradiation under polarized ultraviolet light increased. It was thereby confirmed that like photodecomposition of a polyimide, the silane coupling agent in the present invention underwent anisotropic decomposition to exhibit the alignment-regulating power, when irradiated with polarized ultraviolet light.

INDUSTRIAL APPLICABILITY

The liquid crystal alignment film and the optical element of the present invention are useful for pickup elements, imaging elements, communication devices, etc. and particularly suitable for Blu-ray applications and suitable as an optical element for an optical information writing/reading device.

The entire disclosure of Japanese Patent Application No. 2011-284111 filed on Dec. 26, 2011 including specification, claims, drawings and summary is incorporated herein by reference in its entirety.

What is claimed is:

1. A liquid crystal alignment film obtainable by bonding via a SiO bond, by chemisorption to a surface of a substrate, a silane coupling agent being an alignment-regulating precursor which undergoes anisotropic decomposition by irradiation with polarized ultraviolet light, and irradiating said silane coupling agent bonded to the substrate, with polarized ultraviolet light, to let it undergo anisotropic decomposition and exhibit an alignment-regulating power.

2. A liquid crystal alignment film obtainable by bonding, by chemisorption to a surface of a substrate, an alignment-regulating precursor which undergoes anisotropic decomposition by irradiation with polarized ultraviolet light, and irradiating said silane coupling agent bonded to the substrate, with polarized ultraviolet light, to let it undergo anisotropic decomposition and exhibit an alignment-regulating power, wherein the alignment-regulating precursor is a compound represented by the following formula (1) or (2):

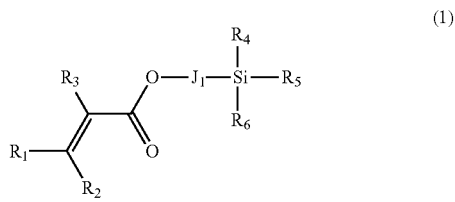

-continued

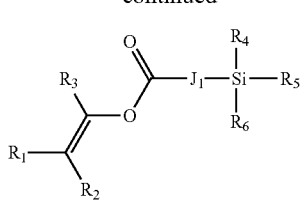
(2)

wherein each of $R_1$ to $R_3$ which are independent of one another, is a hydrogen atom or a methyl group, each of $R_4$ to $R_6$ which are independent of one another, is a chlorine atom, a hydroxy group or a $C_{1-3}$ alkyl group, provided that at least one of them is a chlorine atom or a hydroxy group, and $J_1$ is a straight chain or branched chain $C_{1-10}$ alkylene group or a group represented by —$(CH_2)_o$—X—$(CH_2)_p$—Y—$(CH_2)_q$— (wherein X is —O— or —NH—, Y is —O—, —NH— or a single bond, each of o and q is an integer of from 1 to 3 and p is an integer of from 0 to 3, provided that o+p+q is from 2 to 9).

3. The liquid crystal alignment film according to claim 1, wherein the alignment-regulating precursor is a compound represented by the following formula (3) or (4):

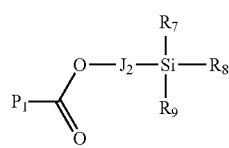
(3)

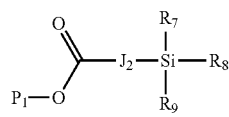
(4)

wherein $P_1$ is a phenyl or biphenyl group which is unsubstituted or substituted by a substituent selected from an alkyl group and an alkoxy group, each of $R_7$ to $R_9$ which are independent of one another, is a chlorine atom, a hydroxy group or a $C_{1-3}$ alkyl group, provided that at least one of them is a chlorine atom or a hydroxy group, and $J_2$ is a straight chain or branched chain $C_{1-10}$ alkylene group or a group represented by —$(CH_2)_o$—X—$(CH_2)_p$—Y—$(CH_2)_q$— (wherein X is —O— or —NH—, Y is —O—, —NH— or a single bond, each of o and q is an integer of from 1 to 3 and p is an integer of from 0 to 3, provided that o+p+q is from 2 to 9).

4. The liquid crystal alignment film according to claim 1, wherein the alignment-regulating precursor is a compound represented by the following formula (5):

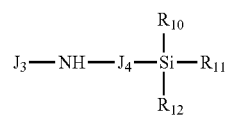
(5)

wherein each of $R_{10}$ to $R_{12}$ which are independent of one another, is a chlorine atom, a hydroxy group or a $C_{1-3}$ alkyl group, provided that at least one of them is a chlorine atom or a hydroxy group, $J_3$ is a $C_{1-4}$ alkyl group or a group having one or more carbon atoms in such a $C_{1-4}$ alkyl group substituted by nitrogen atom(s) and $J_4$ is a $C_{1-5}$ alkylene group or a group having one or more carbon atoms in such a $C_{1-5}$ alkylene group substituted by nitrogen atom(s).

5. The liquid crystal alignment film according to claim 1, wherein the surface of the substrate is divided into a plurality of regions, and in every region, a predetermined alignment-regulating power is imparted.

6. A process for producing a liquid crystal alignment film, which comprises:
   a bonding step of contacting, to a substrate, a solution containing a silane coupling agent being an alignment-regulating precursor which undergoes anisotropic decomposition by irradiation with polarized ultraviolet light, to said silane coupling agent to the substrate via a SiO bond by chemisorption,
   a cleaning step of cleaning the substrate with a solvent to remove the alignment-regulating precursor not bonded to the substrate, and
   a photo-alignment step of irradiating the alignment-regulating precursor bonded to the substrate, with polarized ultraviolet light, to let it undergo anisotropic decomposition and exhibit an alignment-regulating power.

7. The process for producing a liquid crystal alignment film according to claim 6, wherein the alignment-regulating precursor is one selected from compounds represented by the formulae (1) to (5):

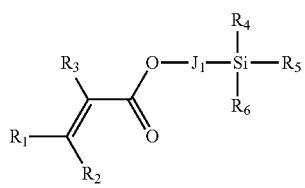
(1)

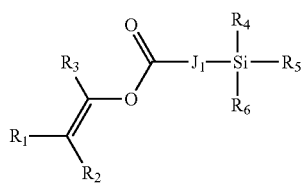
(2)

wherein each of $R_1$ to $R_3$ which are independent of one another, is a hydrogen atom or a methyl group, each of $R_4$ to $R_6$ which are independent of one another, is a chlorine atom, a hydroxy group or a $C_{1-3}$ alkyl group, provided that at least one of them is a chlorine atom or a hydroxy group, and $J_1$ is a straight chain or branched chain $C_{1-10}$ alkylene group or a group represented by —$(CH_2)_o$—X—$(CH_2)_p$—Y—$(CH_2)_q$— (wherein X is —O— or —NH—, Y is —O—, —NH— or a single bond, each of o and q is an integer of from 1 to 3 and p is an integer of from 0 to 3, provided that o+p+q is from 2 to 9),

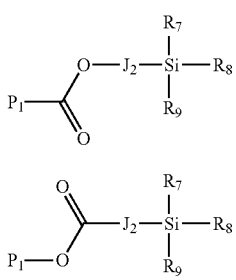

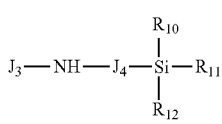

wherein $P_1$ is a phenyl or biphenyl group which is unsubstituted or substituted by a substituent selected from an alkyl group and an alkoxy group, each of $R_7$ to $R_9$ which are independent of one another, is a chlorine atom, a hydroxy group or a $C_{1-3}$ alkyl group, provided that at least one of them is a chlorine atom or a hydroxy group, and $J_2$ is a straight chain or branched chain $C_{1-10}$ alkylene group or a group represented by —$(CH_2)_o$—X—$(CH_2)_p$—Y—$(CH_2)_q$— (wherein X is —O— or —NH—, Y is —O—, —NH— or a single bond, each of o and q is an integer of from 1 to 3 and p is an integer of from 0 to 3, provided that o+p+q is from 2 to 9), and $$\text{(5)} \quad J_3-NH-J_4-\underset{\underset{R_{12}}{|}}{\overset{\overset{R_{10}}{|}}{Si}}-R_{11}$$

wherein each of $R_{10}$ to $R_{12}$ which are independent of one another, is a chlorine atom, a hydroxy group or a $C_{1-3}$ alkyl group, provided that at least one of them is a chlorine atom or a hydroxy group, $J_3$ is a $C_{1-4}$ alkyl group or a group having one or more carbon atoms in such a $C_{1-4}$ alkyl group substituted by nitrogen atom(s) and $J_4$ is a $C_{1-5}$ alkylene group or a group having one or more carbon atoms in such a $C_{1-5}$ alkylene group substituted by nitrogen atom(s).

8. The process for producing a liquid crystal alignment film according to claim 6, wherein in the photo-alignment step, the surface of the substrate is divided into a plurality of regions, and every region is irradiated with polarized ultraviolet light from a predetermined direction, to have a different alignment-regulating power imparted.

9. The process for producing a liquid crystal alignment film according to claim 6, wherein in the photo-alignment step, the substrate is irradiated with polarized ultraviolet light from a predetermined direction, and the region irradiated with polarized ultraviolet light is partially irradiated again with polarized ultraviolet light from a predetermined direction, to have a different alignment-regulating power imparted.

10. An optical element having a polymerizable liquid crystal composition polymerized in a state showing a liquid crystal phase and in a state where liquid crystals are aligned, on the liquid crystal alignment film as defined in claim 1.

11. The optical element according to claim 10, wherein the liquid crystal alignment film is one wherein the surface of the substrate is divided into a plurality of regions to control the polarized light transmittance depending upon the wavelength, and in every region, a predetermined alignment-regulating power is imparted.

12. The optical element according to claim 10, wherein the liquid crystal alignment film is one wherein the surface of the substrate is divided into a plurality of regions to depolarize the polarization, and in every region, a predetermined alignment-regulating power is imparted.

13. An optical information writing/reading device to carry out recording of information on optical recording media and/or reproduction of information recorded on optical recording media, which has the optical element as defined in claim 10.

* * * * *